United States Patent [19]

Stephen et al.

[11] Patent Number: 5,213,075
[45] Date of Patent: May 25, 1993

[54] IGNITER FOR CHARCOAL GRILL

[75] Inventors: James C. Stephen, Arlington Heights; Erich J. Schlosser, Barrington; Andrzej Leja, Palatine; Donald E. Pestka, Bensenville, all of Ill.

[73] Assignee: Weber-Stephen Products Co., Palatine, Ill.

[21] Appl. No.: 740,921

[22] Filed: Aug. 6, 1991

Related U.S. Application Data

[63] Continuation-in-part of Ser. No. 566,082, Aug. 10, 1990, abandoned.

[51] Int. Cl.$^5$ .................. F23Q 13/02; F23Q 3/00
[52] U.S. Cl. .................. 126/25 B; 431/86; 431/87; 431/264; 431/263; 126/41 R
[58] Field of Search ............. 431/191, 354, 263, 264, 431/86, 87, 60, 73, 344; 126/25 B, 25 R, 41 R

[56] References Cited

U.S. PATENT DOCUMENTS

| | | |
|---|---|---|
| D. 176,294 | 12/1955 | Webster . |
| D. 177,293 | 3/1956 | Webster . |
| D. 179,334 | 11/1956 | Webster . |
| D. 186,967 | 12/1959 | Webster . |
| D. 228,731 | 10/1973 | Schmedes et al. . |
| D. 231,183 | 4/1974 | Avant et al. . |
| D. 231,312 | 4/1974 | Nelson et al. . |
| D. 231,561 | 4/1974 | Paulson et al. . |
| D. 248,083 | 6/1978 | Zagara et al. . |
| D. 264,301 | 5/1982 | Miller . |
| D. 284,545 | 7/1986 | Nelson et al. . |
| D. 284,554 | 7/1986 | Nelson et al. . |
| 993,369 | 5/1911 | Hensel .............. 126/25 B X |
| 1,295,907 | 3/1919 | Le Compte ............ 126/25 B |
| 1,867,934 | 7/1932 | Zahner . |
| 2,403,134 | 7/1946 | Stephenson .......... 126/25 B |
| 2,412,655 | 12/1946 | Shannon .............. 431/266 |
| 2,626,661 | 1/1953 | McDowell ............ 431/86 X |
| 2,841,694 | 7/1958 | Webster . |
| 2,954,024 | 9/1960 | Webster . |
| 3,029,807 | 4/1962 | Webster . |
| 3,033,191 | 5/1962 | Bonadiman .......... 126/25 B |
| 3,067,811 | 12/1962 | Webster . |
| 3,078,915 | 2/1963 | Webster . |
| 3,198,239 | 8/1965 | Webster . |
| 3,202,205 | 8/1965 | Webster . |
| 3,219,025 | 11/1965 | Webster . |
| 3,430,622 | 3/1969 | Webster et al. . |
| 3,574,506 | 4/1971 | Locke . |
| 3,590,806 | 7/1971 | Locke . |
| 3,590,860 | 7/1971 | Stenner . |
| 3,605,653 | 9/1971 | Donnell .............. 126/25 B |
| 3,612,037 | 10/1971 | Spiggle . |
| 3,663,154 | 5/1972 | Locke . |
| 3,806,038 | 4/1974 | Nelson . |
| 3,824,984 | 7/1974 | Swanson et al. ...... 431/343 X |
| 3,843,311 | 10/1974 | Nelson . |
| 3,865,137 | 2/1975 | Chvatal . |
| 4,013,395 | 3/1977 | Wormser . |
| 4,103,829 | 8/1978 | Zagara et al. . |
| 4,348,172 | 9/1982 | Miller . |
| 4,422,435 | 12/1983 | Spell ................ 126/25 B |
| 4,526,532 | 7/1985 | Nelson .............. 431/264 X |
| 4,705,021 | 11/1987 | Beach ............... 431/354 X |
| 4,829,978 | 5/1989 | Schlosser ............ 126/41 R |
| 4,891,005 | 1/1990 | Carter ............ 126/25 B X |
| 4,903,683 | 2/1990 | Larsen et al. ........ 126/25 B |
| 4,954,078 | 9/1990 | Nelson . |

FOREIGN PATENT DOCUMENTS 991622 6/1976 Canada ............ 126/25 B

*Primary Examiner*—Carl D. Price
*Attorney, Agent, or Firm*—Wallenstein, Wagner & Hattis, Ltd.

[57] ABSTRACT

A gas burner (11) for a charcoal grill having a bowl (12) includes an elongated burner tube (30) secured to the bowl and passed through an opening (36) in the bowl (12) so as to be positioned in a substantially horizontal manner below and substantially parallel to a bed of charcoal supported on a charcoal support grid (18). The burner has a propane tank (42) connected to the free end thereof outside the bowl (12) and has air intake openings (44) in the tube (30) adjacent the free end. A venturi section (46) is formed into the tube (30) downstream of the air intake openings (44) and elongated diametrically-opposed, horizontal slots (50) defining the gas exit ports are positioned downstream of the venturi section (46). An igniter assembly (52) having its electrode (56,60) extending through an opening into the tube (30) is located between the venturi section (46) and the slots (50) to ignite the flowing gases. The positioning of the electrode (56,60) within the tube (30) prevents flash-back through the air intake openings (44).

16 Claims, 3 Drawing Sheets

IGNITER FOR CHARCOAL GRILL

DESCRIPTION

Reference to Related Application

This application is a Continuation-In-Part application from Ser. No. 566,082, filed Aug. 10, 1990, now abandoned.

TECHNICAL FIELD

The present invention relates generally to outdoor cooking devices such as charcoal grills and, more particularly, to an igniter for such charcoal grills.

BACKGROUND PRIOR ART

Charcoal grills have been in existence for a number of decades and generally consist of a firebox which has a charcoal support grid located in a bottom section thereof and a cooking grid located above and spaced from the charcoal support grid. While numerous outdoor cooking devices have resorted to gas in place of the charcoal, many consumers still desire the charcoal grill because charcoal adds a desirable flavor to the food that is being cooked.

One of the difficulties with charcoal grills is the lighting of the charcoal. Generally speaking, it is customary to spray the charcoal with a lighter fluid or liquid that is very combustible and then ignite the liquid to heat the charcoal to the desired temperature for cooking purposes. This is a very dangerous procedure, since explosions can readily occur if too much liquid is placed on the charcoal. Furthermore, the liquid is generally a butane, which is very readily combustible. In addition, many times, the lighter fluid that is being used produces an undesirable flavor in the food that is being cooked.

Additionally, governing bodies and individuals have recognized the negative environmental impact resulting from the use of lighter fluids and liquids. This concern is so great that some municipalities and states are considering ordinances and laws to ban the use of lighter fluids and liquids.

Many devices have been proposed for eliminating the need for lighter fluid to ignite the charcoal. For example, a number of different electric igniters are in existence and can be utilized with a proper power source for igniting the charcoal. However, many times an electrical power source is not available. Numerous other types of starters utilizing propane gas have also been proposed. However, most of these are portable in nature and require a gas source. Furthermore, such devices are intended to be temporarily placed into the grill below the charcoal to provide the ignition. Thus, there remains a need for a simplified solution for igniting charcoal and one that is permanently incorporated into the charcoal grill.

SUMMARY OF THE INVENTION

According to the present invention, a charcoal grill includes a charcoal support grid in a lower section thereof and a cooking grid adjacent the upper edge and incorporates a gas igniter that is located below the charcoal bed and is permanently mounted in the grill.

More specifically, the charcoal grill includes an elongated burner tube having one end either secured to the inner surface of the grill housing below the charcoal support grid, or cantilevered into the grill housing below the charcoal support grid. The opposite end of the elongated burner tube extends through an opening in the housing. This opposite end of the tube that is outside the grill housing is connected to a pressurized, portable fuel source. A control valve and an optional timer is interposed between the burner tube and the fuel source.

The burner tube has a pair of diametrically opposed, elongated slots formed therein which are positioned along a generally horizontal plane so that the flames are directed upwardly and outwardly in an arcuate manner under the charcoal. The elongated burner tube also has air intake openings adjacent the opposite end with a venturi section located between the air intake openings, inlets, and the exit slots, outlets.

An igniter assembly is secured to the tube and includes spark generating means and spark-emitting means, such as an electrode, positioned in the tube between the venturi and the outlets.

Other advantages and aspects of the present invention will become apparent upon reading the following description of the drawings and detailed description of the invention.

DETAILED DESCRIPTION

Figure 1:
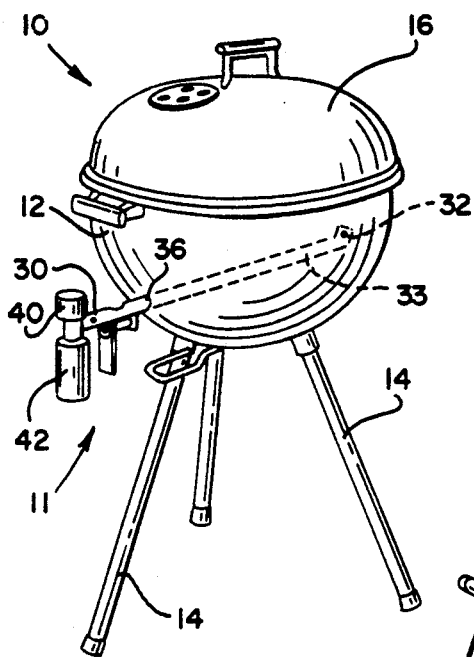
FIG. 1 shows a charcoal grill incorporating the gas igniter of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to embodiments illustrated.

FIG. 1 of the drawings discloses a charcoal grill, generally designated by reference numeral 10. Preferably, the grill is of the type disclosed in U.S. Pat. No. 4,416,248, incorporated herein by reference. The silhouette of this grill is a registered trademark of WEBER-STEPHEN PRODUCTS CO.

Figure 2:
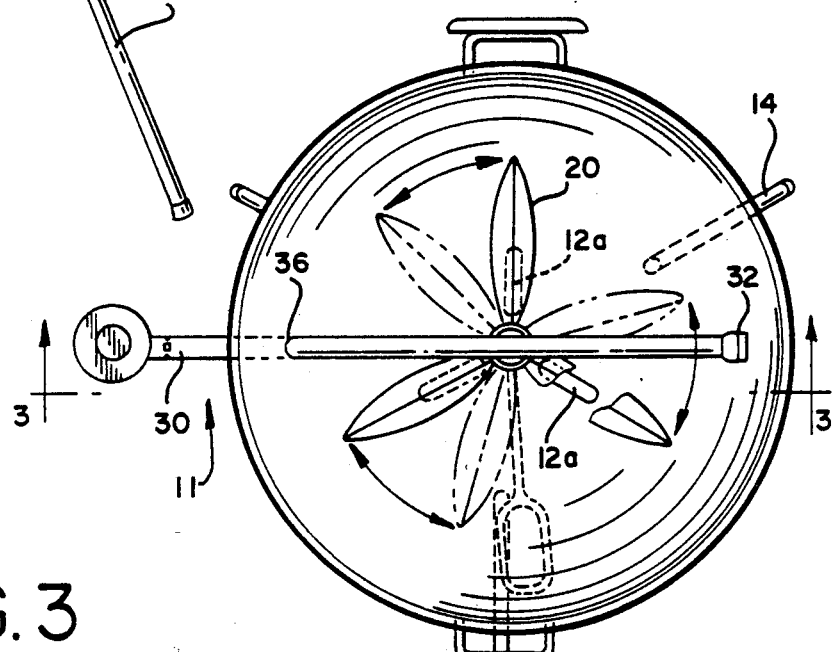
FIG. 2 is a top plan view of the grill with the cover removed.

The grill 10 includes a generally semihemispherical bowl or housing 12 that is supported on a tripod leg arrangement 14 and has a cover 16 positioned thereon. A cooking grid 9 is supported adjacent the upper edge of the bowl and a charcoal support grid 18 is located in a lower section thereof. The charcoal support grid 18 is positioned below and substantially parallel to the cooking grid 9. Thus, when cooking, the charcoal is supported on the grid 18 and air is circulated below and above the charcoal. Air enters the bowl 12 through a plurality of vent holes 12a (FIG. 2) situated in the bottom of the bowl. The charcoal grill also incorporates ash pusher means 20, generally of the type disclosed in U.S. Pat. No. 4,416,248 to sweep ash out the vent holes 12a. Vent holes are also situated in the cover 16 of the kettle 10.

Figure 3:
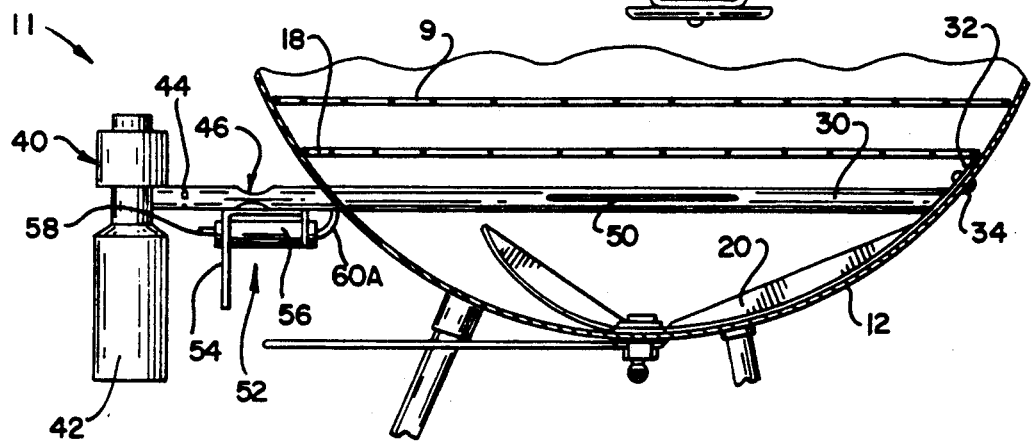
FIG. 3 is a cross-sectional view, as viewed along line 3—3 of FIG. 2.

According to the present invention, a gas igniter 11 is permanently mounted within the bowl and positioned below the charcoal support grid 18 to ignite a bed of charcoal that is located on the support grid. In particular, the igniter 11 is made to be retrofitted onto existing barbecue grills in such a manner so as to be spaced apart from and substantially parallel to the charcoal grid 18. The gas igniter 11 incorporates a generally circular burner tube 30. In one embodiment, shown particularly in FIGS. 1-3, the burner tube 30 is closed off and has an off-set flange 32 at one end which is secured to the bowl through a fastener 34 (FIG. 3). In another embodiment, shown in FIGS. 4-6, the burner tube 30 is closed at the end and not fastened to the bowl. In this second embodiment, the tube 30 cantilevers about half-way into the bowl 12. In both embodiments, the end of the tube 30 within the housing 10 is pinched closed.

Figure 6:
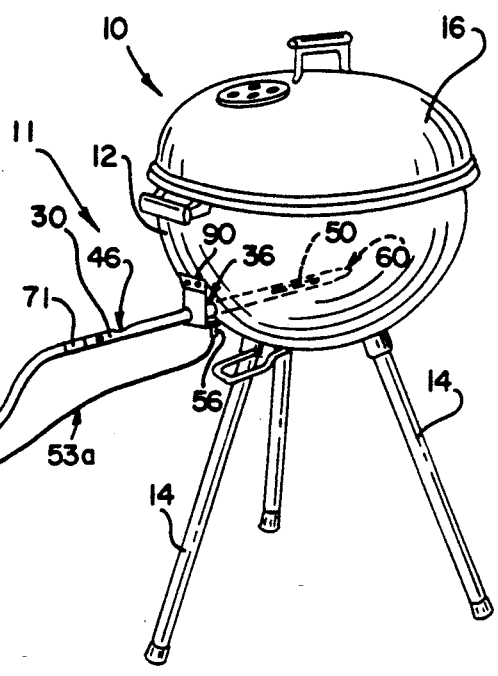
FIG. 6 shows a charcoal grill incorporating the gas igniter of the present invention with the fuel tank spaced away from the grill.

The opposite end of the tube extends through an opening 36 in the bowl and has a valve 40 secured to the open end thereof which has a portable propane tank 42 for supplying pressurized gas to the valve and into the burner tube 30. While a fuel source 42 is shown adjacent the burner tube (FIGS. 1-4), it is appreciated that a fuel tank 42 can be spaced from the tube 30 and grill 10 (FIG. 6). When the fuel tank 42 is spaced from the grill 10, a gas line 70 is used to join the tank 42 and on/off valve 40 to the tube 30. A coupler 71 can be used for this joining.

In addition to the arrangements shown in the drawings, a kettle cart has been developed that supports both a kettle grill 10 and a fuel tank 42 at a comfortable, workable height. This kettle cart is shown in U.S. Pat. No. 5,076,252, issued Dec. 31, 1991, titled BARBECUE GRILL ASSEMBLY.

Figure 7:
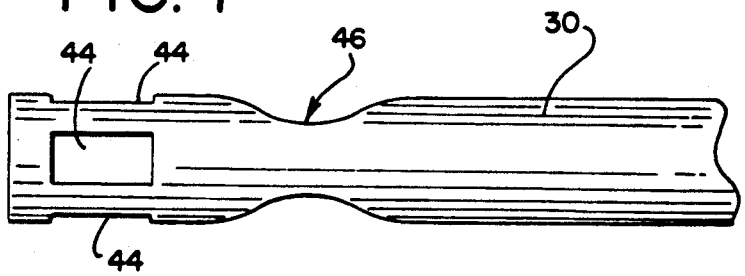
FIG. 7 is a partial side elevational view of the burner tube shown in FIGS. 1-6.
Figure 8:
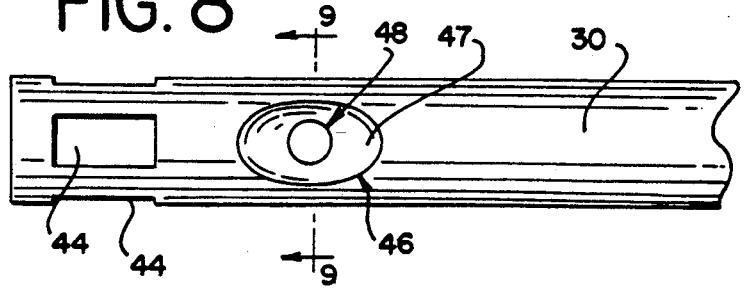
FIG. 8 is a partial top plan view of the burner tube of FIG. 7.

Turning specifically to the burner tube 30, the tube has air intake openings 44 adjacent the end of the tube connected to the fuel source 42 and valve 40 and situated outside the kettle 10. As shown in FIGS. 7 and 8, there are preferably four air-intake openings 44. The openings 44 are circumferentially-spaced, center to center, at approximately 90 degrees from each other.

Figure 9:
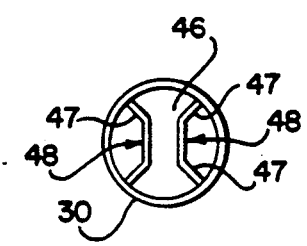
FIG. 9 is a section view along line 9—9 of FIG. 8.

Adjacent the air intake openings or inlets 44, reduced-section venturi means 46 are constructed into the tube 30. The construction of the venturi 46 is shown in detail in FIGS. 7-9. The venturi 46 is formed by pinching opposed sides of the burner tube 30. Each side's pinch deforms the tube so as to have an inwardly inclined portion 47 and a centrally located flattened portion 48. Accordingly, a straight channel 46 is formed between the two flattened portions 48.

The gas burner tube 30 further has a pair of elongated slots 50 which are diametrically-opposed to each other and are located in a generally horizontal plane that extends parallel to the charcoal grid 18. The elongated slots 50 are constructed in this orientation so as to minimize the chance of having ash, drippings, dirt, other debris and grease from falling into them or accumulating around them, clogging them up or hamper their effectiveness. For example, if the slots 50 were facing upwards, ash and grease would fall directly into the burner tube 30 via the slots or fall directly over slots.

In addition, the slots 50 are elongated so that the flame exiting therefrom arcs both outwardly and upwardly. Viewed from one end, the opposed flames would form the bottom half of an oval or egg-like shape. This permits the flame from the slots 50 to spread out and contact a greater amount of surface area of the charcoal briquettes, not only the briquettes directly above the tube but also the briquettes adjacent the perimeter of the charcoal grid 18.

It has been found that using this burner 30 with the elongated slots 50 works particularly well with the charcoal baskets described in U.S. Pat. No. 4,777,927, issued Oct. 18, 1988, assigned to the Assignee of the present invention, WEBER-STEPHEN PRODUCTS CO., and incorporated herein by reference. The two baskets can be filled with charcoal and placed above the flame emitting from the elongated slots 50.

The charcoal igniter also incorporates an igniter 52 that is supported below the tube 30 and outside the barbecue housing 12. The igniter 52 can be supported on a bracket fastened to the tube 30. One such bracket 54 is shown in FIG. 3 and is positioned adjacent the lower surface of the tube 30. The igniter also consists of an electrode assembly 56 that has a pushbutton 58 on one end thereof and a spark-emitting electrode 60 that extends through a tube opening into the tube 30 between the venturi section 46 and the slots 50. The bracket 54 shown is generally L-shaped and defines a gripping portion extending below the igniter that can be grasped to depress the actuating button 58. While not limited to any specific type of igniter, one type is disclosed in U.S. Pat. No. 4,302,181, incorporated herein by reference.

Additionally, as shown generally in FIG. 6, the pushbutton 58 may be spaced from the grill 10, such as when the kettle 10 is supported on a cart, and placed at a convenient, safe location away from the tank. In this additional positioning, a wire 58a may be needed to connect the actuating button 58 to the electrode generating assembly 56 or to connect the electrode generating assembly 56 to the spark-emitting electrode 60.

Thus, in order to ignite the charcoal, the control valve 40 is rotated to the open position. If a timer is incorporated, the valve 40, which usually includes indicia means on the top surface thereof, is opened and rotated to the timed position that is desired and the igniter is then actuated to ignite the gases flowing in the tube. It should be noted that the electrode 60 is located downstream of the reduced venturi section 46 and is positioned such that there is no possibility of igniting the gases flowing through the tube so that flash-back into the air intake openings 44 is prevented. And, by having the electrode 60 spaced away from the slots 50, the electrode 60 stays clean and free of any charcoal, ash, dirt or debris. Moreover, the electrode 60 does not get hot by the burning gases.

Experimentation has shown that about four minutes of ignition of burning gases is sufficient for starting the charcoal, which require 20-25 minutes to be ready to begin the cooking process. Of course, this time may vary to suit the desires of the user.

Figure 4:
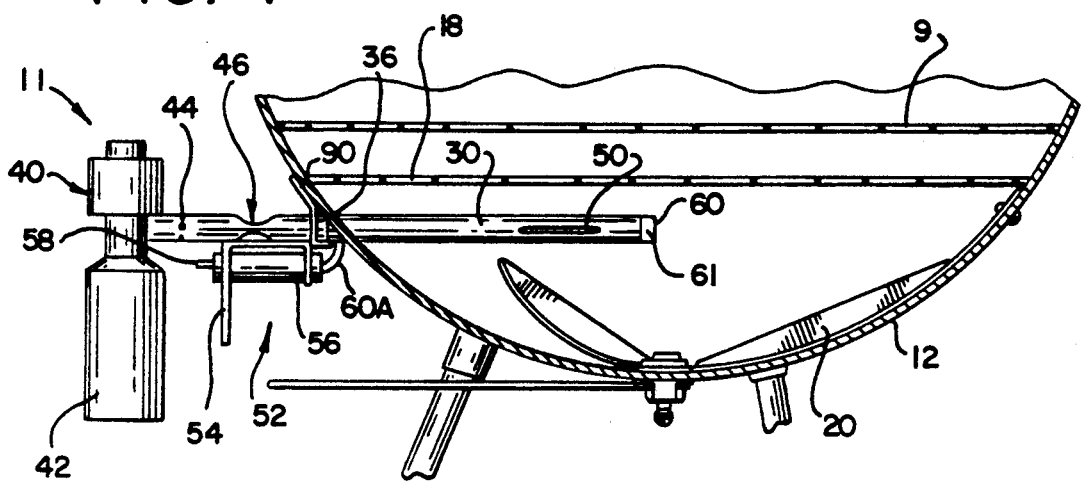
FIG. 4 is a cross-sectional view, as viewed along line 3—3 of FIG. 2 of a second embodiment.

A second embodiment is shown in FIGS. 4-6. In this embodiment, the burner tube 30 is cantilevered into the bowl or housing 12 through an opening 36 in the bowl.

Figure 5A:
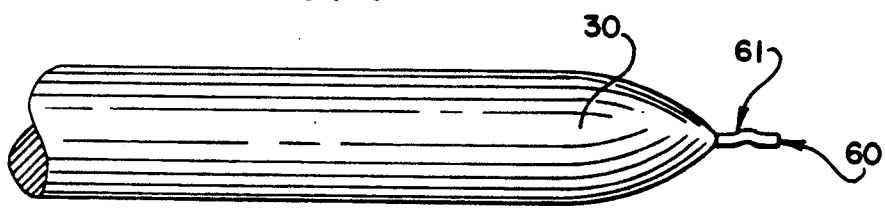
FIG. 5A is a partial top plan view of the burner tube of FIG. 4.
Figure 5B:
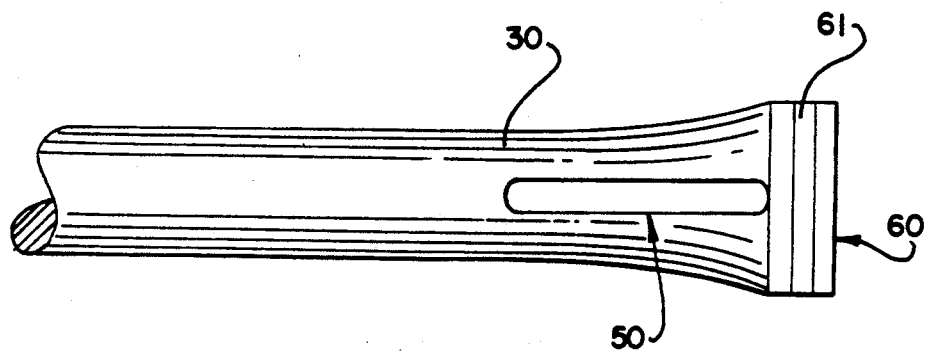
FIG. 5B is a partial side elevational view of the burner tube of FIGS. 4 and 5A.

The tube 30 is supported by a bracket 90 fastened to the exterior of the bowl 12 and extends partially into the bowl. The end of the tube within the kettle 10 is not fastened to the housing. Rather, the free end 60 is pinched 61 so as to seal closed the end of the tube 30. The details of this pinched portion 61 at the end 60 of the tube 30 are shown in FIGS. 5A and 5B.

While it is appreciated that the cantilevered free end 60 can transverse the entire width of the bowl or any fraction thereof, it is preferable to terminate the free end 60 of the tube at or near the center of the bowl 12.

As with the first embodiment, this second embodiment has a pair of elongated slots 50 which are diametrically opposed to each other and are located in a generally horizontal plane that extends parallel to the charcoal grid 18.

Figure 10:
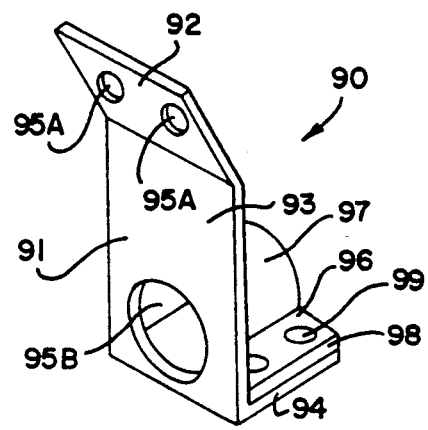
FIG. 10 is a side perspective view of the bracket connecting the burner tube to the charcoal grill.

As noted previously, the burner tube 30 of FIG. 1 is secured to the bottom bowl 12 of the kettle 10 by a fastener 34 at the closed end 32. The burner tube of the second embodiment and shown in FIG. 6, is secured to the exterior of the bottom bowl 12 of the kettle 10 adjacent the opening 36 in the bowl by a bracket 90. This bracket 90 is shown generally in FIG. 10 and comprises two pieces 91,96. The first piece 91 is generally Z-shaped, having an upper angled portion 92, main body 93 and lower base portion 94. The upper portion 92 has two apertures 95A for receiving fasteners to connect the bracket to the bowl 12. The main body 93 of the bracket 90 has a centrally located aperture 95B for receiving the burner tube 30. The lower base portion 94 is preferably perpendicular to the main body portion and has apertures for receiving fasteners that connect it to the second piece 96. The second piece is generally U-shaped, having a arcuate portion 97 for receiving the tube 30 and two flanges 98, each with apertures 99 aligned with the first piece's apertures for receiving the connecting fasteners. Accordingly, the tube 30 is threaded through the main aperture of the first piece 91, sandwiched between the first and second piece 91,96e and the first piece is connected to the bowl 12. Thus, the burner tube 30 is held in a substantially horizontal relationship below the charcoal support 18.

In practice, it has been found that a stainless steel burner tube of about 0.750" outside diameter works well. Four generally rectangular inlet openings having a length of about 0.625" and width of 0.312" are spaced at positions 90 degrees from each other. The venturi is formed in a manner discussed previously so as to have flattening opposite sides of the tube so leaving a passageway of about 0.186" therebetween.

At the other, closed end, it is crimped, about 0.375". In practice, the two opposed elongated outlet ports are about 1.56" long and about 0.189" wide.

Finally, to minimize the chances of having a spider or other insect nest within the burner tube, a spider guard can be secured to the tube around the outlets. An excellent guard is disclosed in U.S. Pat. No. 4,829,978, entitled "Gas Grill With Insect Deterrent," and assigned to WEBER-STEPHEN PRODUCTS CO. A spider guard may also be secured around the inlets of the tube, if desired.

Of course, numerous modifications come to the mind without departing from the spirit of the invention. For example, the elongated slots in the burner tube could be replaced with a plurality of elongated openings. Also, if a permanent source of pressurized gas is available, the portable bottle could be replaced with a permanent connection.

While the specific embodiments have been illustrated and described, numerous modifications come to mind without significantly departing from the spirit of the invention and the scope of protection is only limited by the scope of the accompanying claims.

We claim:

1. A gas igniter in combination with a charcoal grill comprising:
   a grill housing having substantially horizontal charcoal support grid in a lower section thereof;
   a food support grid located above said charcoal support grid;
   an opening within said grill housing below said charcoal support grid;
   a burner tube passing through said opening and having an open, exposed first end outside said grill housing and a closed second end within said grill housing,
   said tube extending substantially horizontal across said grill housing below said charcoal support grid,
   said tube further having a first opening therein outside said grill housing adjacent said first end for the inlet of air into said tube, a second opening therein inside said grill housing adjacent said second end for defining outlets for the ignited gas, and venturi means between said first opening and said second opening, said first opening being at least one air intake opening, said second opening being at least two diametrically located generally horizontal slots;
   a pressurized gas source connected to said exposed first end of said tube; and,
   ignition means having actuating means, an electrode generating assembly and a spark-emitting electrode, said actuating means and said electrode generating assembly being positioned outside said housing and said electrode being positioned in said tube and entering said tube outside said housing for igniting gases flowing through said tube.

2. An igniter as defined in claim 1, in which said ignition means includes said spark emitting electrode extending into said tube between said venturi means and said slots.

3. An igniter as defined in claim 2, in which said burner tube is secured to said bowl at one end thereof.

4. An igniter as defined in claim 2, in which said burner tube is cantilevered into said bowl at one end thereof.

5. An igniter as defined in claim 1, in which said valve has a timer associated therewith.

6. An igniter as defined in claim 1, in which said burner tube is connected to said bowl by an exterior bracket,
   said bracket being fastened to said bowl and being adapted to hold said tube in a substantially horizontal position.

7. An igniter for a bed of charcoal in combination with a charcoal grill, comprising:
   a housing having a bowl and a cover;
   a horizontal first grid in said bowl for supporting food;
   a horizontal second grid in said bowl below said first grid for supporting the charcoal;
   an opening within said bowl below said second grid;
   a substantially horizontal gas burner tube passing through said opening and having one end closed and connected to an inner surface of said bowl below said second grid and an opposite end located outside said bowl, said tube having at least one inlet for air in said tube located outside said bowl adjacent said opposite end and at least one outlet for the ignited gas located inside said bowl adjacent said one end, said outlet being at least two generally horizontal diametrically positioned elongated slots;

venturi means between said inlet and said outlet;

a pressurized gas fuel source connected to said opposite end of said tube with a shut-off valve interposed therebetween; and, ignition means having actuating means, an electrode generating assembly and a spark-emitting electrode, said actuating means and said electrode generating assembly being positioned outside said housing and said electrode being positioned in said tube and entering said tube outside said housing for igniting gases flowing through said tube between said venturi means and said elongate slots.

8. An igniter as defined in claim 7, in which said burner tube is connected to said bowl by an exterior bracket, said bracket being fastened to said bowl and being adapted to hold said tube in a substantially horizontal position.

9. An igniter for a bed of charcoal in combination with a charcoal grill, comprising:

a housing having a bowl and a cover;

a horizontal first grid in said bowl for supporting food;

a horizontal second grid in said bowl below said first grid for supporting the charcoal;

an opening within said bowl below the grid;

a substantially horizontal gas burner tube passing through said opening and having one end closed and cantilevered into said bowl below said second grid and an opposite end located outside said bowl, said tube having at least one inlet for air in said tube located outside said bowl adjacent said opposite end and at least one outlet for the ignited gas located inside said bowl adjacent said one end, venturi means between said inlet and said outlet;

a pressurized gas fuel source connected to said opposite end of said tube; and, ignition means having actuating means, an electrode generating assembly and a spark-emitting electrode, said actuating means and said electrode generating assembly being positioned outside said housing and said electrode being positioned in said tube and entering said tube outside said housing for igniting gases flowing through said tube between said venturi means and said outlet.

10. An igniter as defined in claim 9, in which said inlet is a plurality of openings and said outlet is at least two generally horizontal diametrically positioned elongated slots.

11. An igniter as defined in claim 9, in which said burner tube extends approximately halfway into said housing and said closed end is pinched.

12. An igniter as defined in claim 11, in which said burner tube is connected to said bowl by an exterior bracket, said bracket being fastened to said bowl and being adapted to hold said tube in a substantially horizontal position.

13. An igniter for a bed of charcoal, said charcoal being supported on a substantially horizontal grid located within a bowl, comprising:

an opening within the bowl below the grid;

a substantially horizontal gas burner tube passing through said opening and having one end cantilevered into the bowl below the grid and an opposite end located outside the bowl, said tube extending approximately half-way into said housing and having a first opening therein defining at least one inlet for air into said tube located outside the bowl adjacent said opposite end and a second opening therein defining at least one outlet for the ignited gas located inside the bowl adjacent said one end, a pinched free end, venturi means between said first and second openings and said tube being connected to the bowl by an exterior bracket, said bracket holding and maintaining said tube in a substantially horizontal position, said bracket including first and second connecting pieces, said first piece being generally Z-shaped and having an upper inclined portion fastened to the bowl, a main portion with an aperture for receiving said tube and a substantially perpendicular base portion for cooperating with said second piece, said second piece being generally U-shaped and having an arcuate portion for forming a channel for abutment with said tube and two outwardly extending flanges for cooperating with said first piece;

a pressurized gas fuel source connected to said opposite end of said tube; and, ignition means including a spark emitting electrode extending into said tube for igniting gases flowing through said tube between said venturi means and said second set of openings.

14. An igniter for a bed of charcoal, said charcoal being supported on a substantially horizontal grid located within a bowl, comprising:

an opening within the bowl below the grid;

a gas burner tube passing through said opening in the bowl, said tube having an air inlet therein adjacent a first end outside the housing, an air outlet therein inside the bowl and venturi means between said inlet and said outlet;

a pressurized gas fuel source connected to said first end of said tube with a shut-off valve interposed therebetween;

connection means for connecting and holding said tube to the bowl in a substantially horizontal position spaced below the horizontal grid, said bracket including two connecting pieces, a first piece of said connecting pieces being generally Z-shaped and having an upper inclined portion fastened to the bowl, a main portion with an aperture for receiving said tube and a substantially perpendicular base portion for cooperating with a second piece of said connecting pieces;

said second piece of said connecting pieces being generally U-shaped and having an arcuate portion for forming a channel for abutment with said tube and two outwardly-extending flanges for cooperating with said first piece of said connecting pieces; and, ignition means including a spark emitting electrode extending into said tube between said venturi means and said outlet for igniting gases flowing through said tube.

15. An igniter for a bed of charcoal, said charcoal being supported on a substantially horizontal grid located within a bowl, comprising:

an opening within the bowl below the grid;

a gas burner tube passing through said opening in the bowl, said tube having a set of air inlets therein adjacent a first end outside the housing, at least two diametrically located generally horizontal outlets therein inside the bowl and venturi means between said inlets and said outlets;

a pressurized gas fuel source connected to said first end of said tube with a shut-off valve interposed therebetween;

connection means for connecting and holding said tube to the bowl in a substantially horizontal position spaced below the horizontal grid, said connection means including first and second connecting pieces, said first piece being generally Z-shaped and having an upper inclined portion fastened to the bowl, a main portion with an aperture for receiving said tube and a substantially perpendicular base portion for cooperating with said second piece, said second piece being generally U-shaped and having an arcuate portion for forming a channel for abutment with said tube and two outwardly extending flanges for cooperating with said first piece; and, ignition means including a spark emitting electrode extending into said tube between said venturi means and said second set of openings for igniting gases flowing through said tube.

16. A gas igniter in combination with a charcoal grill comprising:

a grill housing having substantially horizontal charcoal support grid in a lower section thereof;

a food support grid located above said charcoal support grid;

a housing opening within said grill housing below said charcoal support grid;

a burner tube passing through said housing opening and having an open, exposed first end outside said grill housing and a closed second end within said grill housing, said tube extending substantially horizontal across said grill housing below said charcoal support grid, said tube further having a first air intake opening means therein outside said grill housing adjacent said first end for the inlet of air into said tube, a second opening means therein inside said grill housing adjacent said second end for defining outlets for the ignited gas, and venturi means between said first opening means and said second opening means, said second opening means being at least diametrically located generally horizontal slots;

a pressurized gas source connected to said first end of said tube;

a shut-off valve interposed between said gas source and said burner tube;

connection means for connecting and holding said tube to the bowl in a substantially horizontal position spaced below the horizontal grid;

ignition means having actuating means, an electrode generating assembly and a spark-emitting electrode, said actuating means and said electrode generating assembly being positioned outside said housing and said electrode being positioned in said tubes between said venturi means and said slots and entering said tube outside said housing for igniting gases flowing through said tube; and, a timer cooperating with said ignition means.

* * * * *